(12) United States Patent
Jain et al.

(10) Patent No.: US 9,563,355 B2
(45) Date of Patent: Feb. 7, 2017

(54) METHOD AND SYSTEM OF DATA ENTRY ON A VIRTUAL INTERFACE

(71) Applicants: Rajeev Jain, San Jose, CA (US); Sahil Jain, San Jose, CA (US); Sagar Jain, San Jose, CA (US); Sumit Jain, San Jose, CA (US)

(72) Inventors: Rajeev Jain, San Jose, CA (US); Sahil Jain, San Jose, CA (US); Sagar Jain, San Jose, CA (US); Sumit Jain, San Jose, CA (US)

(*) Notice: Subject to any disclaimer, the term of this patent is extended or adjusted under 35 U.S.C. 154(b) by 280 days.

(21) Appl. No.: 14/254,897

(22) Filed: Apr. 17, 2014

(65) Prior Publication Data
US 2015/0301739 A1 Oct. 22, 2015

(51) Int. Cl.
| | |
|---|---|
| *G06F 3/048* | (2013.01) |
| *G06F 3/0488* | (2013.01) |
| *G06F 3/01* | (2006.01) |
| *G06F 3/023* | (2006.01) |
| *G06F 3/0482* | (2013.01) |

(52) U.S. Cl.
CPC .......... *G06F 3/04886* (2013.01); *G06F 3/018* (2013.01); *G06F 3/0233* (2013.01); *G06F 3/0482* (2013.01)

(58) Field of Classification Search
CPC .............. G06F 3/018; G06F 3/0233–3/0237; G06F 3/0416; G06F 3/0488–3/04883; G06F 17/276
See application file for complete search history.

(56) References Cited

U.S. PATENT DOCUMENTS

| | | | |
|---|---|---|---|
| 4,748,443 | A | 5/1988 | Uehara |
| 4,959,870 | A | 9/1990 | Tachikawa |
| 5,307,267 | A | 4/1994 | Yang |
| 5,862,251 | A | 1/1999 | Al-Karmi |
| 6,075,469 | A | 6/2000 | Pong |
| 6,874,960 | B2 | 4/2005 | Daoud |

(Continued)

FOREIGN PATENT DOCUMENTS

GB 2243704 6/1991

OTHER PUBLICATIONS

"Text Entry for Mobile Computing: Models and Methods, Theory and Practice" (MacKenzie et al., http://www.yorku.ca/mack/hci3-2002.pdf), 53 pages.

*Primary Examiner* — Claudia Dragoescu

(57) ABSTRACT

A novel keyboard interface and input method are described. The interface is driven by a dynamic, general-purpose typing and data-entry software application, with a reduced number of keys to minimize screen real-estate requirements, especially for mobile devices. At any given time, the interface presents base characters with built-in key points on or around the base characters that can be selected and/or swiped to generate characters. The key points are strategically placed based on the intuitiveness of such placements, reducing the curve for learning how to use the interface. Its advantage over other methods of input such as handwriting, voice and gesture recognition is that it is less prone to error and privacy issues. The interface occupies a dramatically smaller area of the screen compared to traditional on-screen keyboards and can provide alternate placement as well as transparency to reveal text or images underneath. It can be implemented in most mobile and other computing platforms with reduced resource requirements.

20 Claims, 10 Drawing Sheets

(56) References Cited

U.S. PATENT DOCUMENTS

| | | | |
|---|---|---|---|
| 2008/0122806 A1 | 5/2008 | Ahu | |
| 2009/0267901 A1* | 10/2009 | Park | G06F 3/018 345/172 |
| 2012/0306747 A1* | 12/2012 | Davidson | G06F 3/04895 345/160 |
| 2013/0009881 A1 | 1/2013 | Paul | |
| 2013/0027434 A1 | 1/2013 | Paul | |
| 2013/0169540 A1* | 7/2013 | Dinh | G06F 3/04886 345/168 |

* cited by examiner

METHOD AND SYSTEM OF DATA ENTRY ON A VIRTUAL INTERFACE

CROSS-REFERENCE TO RELATED APPLICATIONS

This application claims the benefit of the following U.S. Provisional Patent Application, which is incorporated by reference herein in its entirety for all purposes: U.S. Provisional Patent Application No. 61/814,716, filed Apr. 22, 2013, entitled "Method of Data Entry Based on Character Morphing."

FIELD OF INVENTION

This patent application generally relates to inputting characters using a highly compact and versatile virtual keyboard. Specifically, the keyboard may be implemented in a variety of platforms, including personal computers, touchscreen devices, and other mobile devices.

BACKGROUND OF THE INVENTION

Keyboards have been an integral part of computing since the beginning of the technological revolution. Mechanical character-input devices made to replace handwriting started being used as far back as times of typewriters. As new technologies emerged, input devices and methods were adopted in various ways, such as keyboards, mice, styli, speech recognition, and touchscreens. Since then, we have seen the introduction of several auxiliary functions (e,g., "Ctrl" button, "Alt" button, mouse wheel) for keyboards and mice to enhance their functionality. However, very little change has gone through the basic concept and architecture of the keyboards.

For most human-machine interactions today, the QWERTY keyboard layout, whether physical or on screen, remains the most widely used and default standard for reasons of relative speed, convenience, and error-free data entry. The standard QWERTY layout for the English keyboard was first optimized based on the finger positioning, convenience, and statistical frequency of character and word utilization in common writing. Other layouts such as Dvorak and Colemak were developed based on their own analyses. Other languages also have keyboard layouts based on their own assessment of the placement of character keys.

With ever-evolving electronic devices, the design of conventional keyboards started becoming less convenient, especially after the widespread development and use of smartphones, smart TVs, tablets, and related mobile applications. Several other methods (e.g., handwriting recognition, gesture recognition, voice recognition, software keyboard with touch screens) have been introduced as alternate forms of human interaction with ever-modernizing electronic devices.

Most current alternatives to physical keyboards have their drawbacks, limitations and other compromises. For example, U.S. Pat. No. 8,754,864 to Paul discloses a touchscreen keyboard and a method that generates a geometric shape for each finger of a user (ten total), the positioning corresponding to the characters on a conventional two-handed keyboard, each shape including characters at predefined locations around the perimeter of the shapes. The keyboard operation module detects a sliding movement of a finger from inside the shape and toward the perimeter of the shape, and then displays the particular character in a text-entry area. The main drawback of this prior art is that it requires and occupies too much screen space. With several keys operating at once, the keyboard requires significant horizontal space on the screen. Further, with several keys spread across the screen of a touchscreen device, it may be difficult for a user to type as if it were a physical keyboard. Its practical use may be limited only to larger devices such as tablets. The present invention eliminates these drawbacks.

Handwriting recognition, gesture recognition, and voice recognition are highly computation intensive, slow, and prone to error. Voice recognition is especially vulnerable to privacy issues because attempted input through speech may be heard by others—multiple times depending on the accuracy of the recognition program. An on-screen QWERTY keyboard on touchscreen devices would be less error-prone, but the layout takes up a very large portion—often half or all depending on the orientation of the device—of the relatively small displays of mobile devices. Moreover, the standard QWERTY layout may not fit within certain devices, such as a smartwatch or a remote controller for a smart TV. Therefore, a way to input characters with minimal sacrifice of screen real estate is desirable.

SUMMARY OF THE INVENTION

The present invention aims to overcome problems associated with current technologies by providing an interface and a method to input characters that can be used with existing and future electronic devices.

The following presents a summary of the invention and a basic understanding of some of the aspects of the invention. It is not intended to limit the scope of the invention or provide critical elements of the invention. Its sole purpose is to present some of the features of the invention in a simplified form as a prologue to the more detailed description presented later.

In one aspect, a method of data entry using a graphical user interface is disclosed. In one embodiment, the method includes causing the display on a screen of an electronic device a base character, the base character having a plurality of predefined areas, each predefined area corresponding to at least one final character; enabling the selection of a first area corresponding to a desired final character, the first area being one of the plurality of predefined areas for the base character; morphing the displayed base character into an intermediary character that directly overlaps the base character, the morphing of the displayed base character comprising transforming a shape of the base character to that corresponding to the intermediary character, the transformed shape corresponding to the intermediary character, the intermediary character comprising a precursor to the desired final character; and generating the desired final character.

In a second aspect, a non-transitory computer-readable medium having a plurality of instructions stored therein is disclosed. In one embodiment, the plurality of instructions are configured to, when executed by a processor, cause an electronic device to: display, on a graphical user interface of a screen of an electronic device, a base character, the base character comprising a plurality of predefined areas on or around itself, each predefined area corresponding to at least one final character, a portion of the base character comprising a shape that is similar to a stroke used in the final character; receive a selection of an area corresponding to a desired final character, the area being one of the plurality of predefined areas on or around the base character; morph the displayed base character into an intermediary character, the morphing of the displayed base character is configured to transform a shape of the base character to that corresponding to the intermediary character, the intermediary character being configured to overlay directly on the base character, the intermediary character comprising a corresponding precursor form of the desired final character; and generate the desired final character.

In a third aspect, a system of data entry is disclosed. In one embodiment, the system includes an electronic device with a screen configured to display a virtual graphical user interface, wherein the virtual graphical user interface is configured to: display a base character defined for a selected language, the base character having a plurality of predefined areas on or around the base character, each area corresponding to at least one final character, wherein a portion of the base character comprises a shape that is similar to a stroke used in the final character; enable selection of an area corresponding to a desired final character, the area being one of the plurality of predefined areas on or around the base character; morph the displayed base character into a corresponding intermediary character, the corresponding intermediary character configured to directly overlap the base character, the corresponding intermediary character comprising a precursor form of the desired final character, and generate the desired final character, wherein the desired final character is stored in the electronic device.

It is an object of this invention to dramatically reduce the number of keys that are presented to the user at a given time. This dynamic virtual keyboard has fewer keys compared to standard keyboards such as a QWERTY keyboard. It takes up a smaller space than currently used by on-screen keyboards. It can be placed anywhere on the available screen area of a monitor or a mobile device.

In some embodiments, the keys presented to the user comprise a limited number of base characters, symbols, or shapes. For instance, the entire set of keys consists of two shapes that resemble a line and a circle. This allows the "keyboard" to consume relatively little real estate, a quarter of the screen at most and likely significantly less. The user also has the option to modify settings on the fly for selecting upper/lower case and changing character mode (e.g., digits, punctuation, or letters). The user is also given flexibility in interacting with the keyboard layout. For example, although the keyboard interface is provided some transparency to reveal content underneath, the user may drag it to another location on the screen, or enlarge or shrink it to match the user's preferences.

Each key, or base character, has an associated key area defined that is strategically placed on or around the base character. The user may perform suggestive commands to manipulate the base character, which are based on placing the mouse, finger, stylus, or other interactive apparatus at the location of an appropriate key area. This action causes the base character to display a morphed character, which looks similar to the character to be generated.

As an example, the user drags or places a finger on a base character shaped like a circle. As defined by the program, placing the finger at a certain location near the lower right corner morphs the circular base character into a shape that resembles the letter "a" on the screen, while placing or moving the finger to the right side of the circle morphs the circle into a shape that resembles the letter "c" on the screen. Simultaneously on another part of the interface, a preview of the intended output is displayed, in this case, the letter "a" or "c." These modifications are based on the similarities between the base characters and the morphed characters. The circular base character can morph into a form of the letter "a"—consisting of a circle and a vertical leg, also known as script, Italics, or single-story minuscule "a" (see FIGS. 1, 2b and 2c, and compare the double-story, Roman form "a" as it appears Times New Roman and similar nonscript type fonts to the form as it appears in Comic Sans and other script type fonts). The script form of "a" is an approximate modification of the circular shape of the base character by adding a short downward line to the right side. Conversely, the circle can morph into a "c" by approximate modification by removing a short segment of the circle from the right side, creating the approximate shape of the letter "c." In a like fashion, elongated letters such as "i" or "k" can be created based on a base character shaped like a line. Such visually driven modification of merely two base symbols assists in quick learning and memorization of key areas, leading to a short learning curve for operation of this nontraditional character-input method.

With suggestive commands that allow the use of a finger, mouse, stylus pen, visual gestures, or even a remote controller, the user is given multiple options to morph the base character. In most situations, the user is able to preview the characters to be inputted before they are generated into the text field. In the above example, the letter previewed would be the letter "a" (or "A" depending on whether the user has chosen to enable upper-case letters). By clicking the mouse or letting go of the finger or stylus, the previewed letter is inputted into the text field.

In some embodiments, the data entry method and software for the virtual interface described so far can be implemented in multiple languages, operating systems, and devices, e.g., smartphones, tablets, PCs or TVs running iOS, Android or Windows. The same version can be designed to support one or multiple languages.

BRIEF DESCRIPTION OF THE DRAWINGS

For a better understanding of the aforementioned aspects of the present invention and additional aspects and embodiments thereof, reference should be made to the Detailed Description of the Invention, below, in which reference numerals refer to corresponding parts throughout the accompanying figures provided.

DETAILED DESCRIPTION OF THE INVENTION

Figure 1:
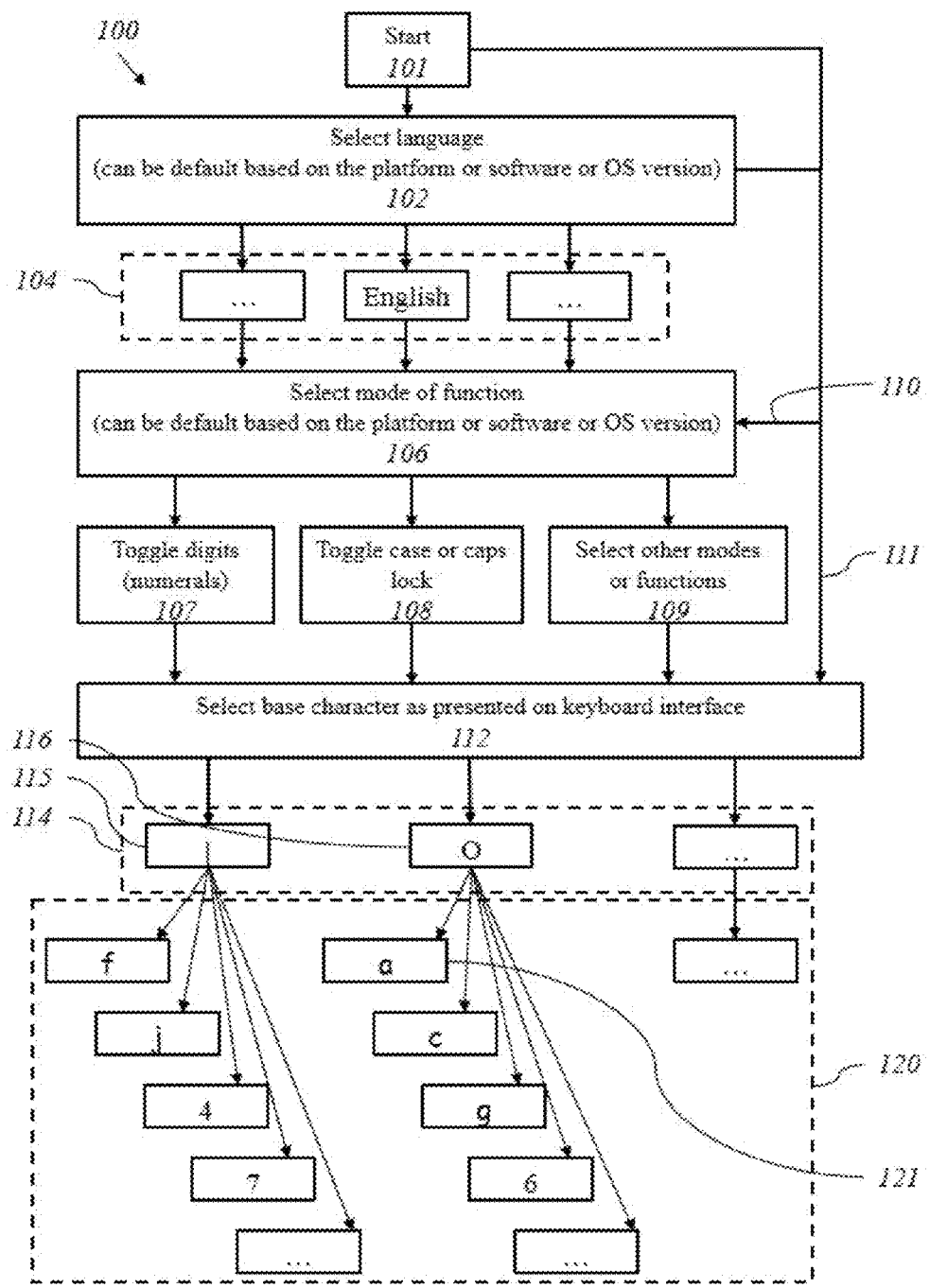
FIG. 1 is a block diagram illustrating a general overview of a process for generating a character on a screen using a virtual keyboard interface designed for the English language.

Reference numerals refer to corresponding parts labeled throughout the accompanying figures. The embodiments described herein pertain to a virtual keyboard interface that can be displayed on a screen within a graphical user interface. The embodiments pertain to methods and apparatuses for one or more of the following steps involved in inputting characters using a virtual keyboard interface: displaying base characters, symbols, or shapes; morphing the base character according to a user's action; previewing an intended character for input; inputting and displaying the final character. In some embodiments, the user generates characters into a text field by moving a mouse pointer or a finger over the displayed area of the interface, which contains predetermined or preprogrammed sections that correspond 1:1 to different characters.

As used herein, the term "base character" means one of the few shapes or symbols that the user interacts with to generate characters into a text field. They are essentially the keys the user types with. In preferred embodiments, each base character is an approximate shape of the characters—letters, numbers, punctuations—that can be generated. For example, if there are two base characters that look like a line segment and a circle, the linear base character may generate characters such as the Arabic numeral "1" or the letter "k" while the circular base character may generate the numeral "8" or the letter "c."

As used herein, the term "final character" means a letter, number, punctuation or other character inputted into a text field or otherwise recognized by a program or an application on a device. It is a character that would be on a conventional on-screen QWERTY keyboard.

As used herein, the terms "morph," "morphing," "morphed character" and other similar variations relate to the changed state and appearance of a base character. In some embodiments, the base character is filled with a lighter color in its default state. By placing the mouse pointer over or holding a finger on a particular spot on or near the base character, a corresponding morphed character appears. The corresponding morphed character is a new shape similar to a desired final character to be generated, overlaid directly on top of the base character. In some embodiments, this new shape is in a darker color overlaid on top of the base character. For example, placing the finger over a particular area corresponding to the final character "j" on or around the linear base character morphs the linear base character to a shape resembling the letter "j." Doing the same over a particular area corresponding to the final character "h" on or around the circular base character morphs the circular base character to a shape resembling the letter "h," although the original base character may still be partially visible under the morphed character; the morphed character extends into the circular base character rather than covering it entirely. In other embodiments, the morphed character may be a sub-base character that may morph again. These features are further described below See FIGS. 2b through 2e for graphical views.

As used herein, the term "keyboard" means a set of keys, either a traditional physical instrument such as a typewriter or a QWERTY keyboard, or an on-screen interface such as one that is displayed a mobile device or computer monitor. Keys are used to generate and input characters.

As used herein, the term "virtual interface" means an interface created or displayed by means of a computer software. The word "virtual" is analogous to "non-physical," and preferred embodiments relate to interaction with a screen of an electronic device. By association, the phrase "virtual keyboard interface" means an on-screen keyboard with which a user may interact to create, input, display, and otherwise manipulate characters of a language according to the user's intent and/or for interpretation by software or applications.

As used herein, the term "graphical user interface," also known as "GUI," means an interface between a device and a user, typically displayed on a screen of the device, that is represented by various controllable elements, including but not limited to menus, options, icons, base characters, cursor, and bounded areas acting independently of other areas of the screen.

As used herein, the term "swiping" means an action in which a user of a virtual interface, such as a touchscreen or a monitor, utilizes a selection tool—such as a mouse, finger or stylus—to select one area, where variations of the words "select," "selection," and "selecting" mean choosing and tapping the selection, holding the selection for a particular amount of time, or holding the selection and releasing the selection in another area that acknowledges such action. In some instances, the start location and end location must be accurately placed. In other instances, the act of swiping is not dependent on the location of the start and end points. For example, a smartphone user may "swipe" a finger from left to right anywhere on the screen as a way to input a certain command, such as moving to an adjacent screen. In other instances, swiping may comprise a combination of both location-dependent and location-independent motions. For example, starting at a particular point on the virtual interface and swiping in one direction, regardless of the distance or end point, may give rise to a command or input.

Above-defined terms otherwise have commonly accepted and plain meanings known to those with ordinary skill in the art. The terminology used in the descriptions of the embodiments herein is for the purpose of describing particular embodiments only and is not intended to limit the claims. The singular articles "a," "an" and "the" are intended to include the plural forms as well, unless the context clearly indicates otherwise. It will also be understood that the term "and/or" refers to and encompasses any and all possible combinations of one or more of the associated listed terms. Similarly, the conjunction "or" is not necessarily mutually exclusive.

References will now be made in detail to embodiments, accompanied by numerals that correspond to appropriate parts of the figures. Specific details will be set forth to provide a thorough understanding of the present invention. Examples will be provided to illustrate the flexibility in various ways the present invention may be utilized. However, it will be apparent to those with ordinary skill in the art that the present embodiments may be practiced without these specific details. In other instances, known methods, procedures and components have not been described in detail to avoid unnecessarily obscuring aspects of the embodiments.

FIG. 1 illustrates the overarching concept of the present invention. The process for recognizing characters to be inputted driven by a software or an application can be laid out by a flowchart 100. The software may display the interface by triggering 101 its appearance or starting 101 the application. The interface may appear, for example, when tapping on the text field of a mobile device, which typically causes a keyboard to appear in the bottom half of the screen. As another example, a monitor connected to a PC may display the interface embodying the present invention in a small, select location. It may be operable by mouse. By way of comparison, the On-Screen Keyboard is a feature in most Windows environments that displays a QWERTY layout on the screen. For the On-Screen Keyboard, a user would move and click the mouse on the screen to select keys, which are scattered across the On-Screen Keyboard. Inputting remotely could be used in situations in which the user is away from the physical keyboard (e.g., during a presentation), is aware of potential security risks (e.g., masking keystrokes by using a mouse rather than a physical keyboard), or prefers an alternate accessibility option (e.g., the physical keyboard is broken or otherwise cannot be used).

Software driving the interface allows the option to select a default language 102 if it has not been selected already. For example, the language may be set to English, but the software may allow adoption of other languages. The flowchart shows a set 104 of languages that may come with the interface software. The user may switch languages or keep them as the default for whenever the interface is used. Once the language is selected, the user may select a mode of function 106. For example, the user may desire to input a numeral, in which case the user would toggle a digits option 107. The user may also change between upper- and lowercase letters 108 if supported by the language, such as English or others based on a Latin-derived alphabet. Other modes 109 such as punctuation may also be selected according to the user's intended input. The user is not limited to first selecting 102 language 104 or mode of function 106 every time. The user may select a mode 110 or begin typing right away 111 after the interface is brought up 101.

In some embodiments of the English version, there are two base characters presented to the user. In other embodiments, there may be more or fewer base characters 114, including one dedicated to punctuation marks. One base character is an elongated line segment 115, and the other is a circular figure 116. Linear base character 115 and circular base character 116 provide the keys that the user may interact with. Selecting one gives access to one set of characters; selecting the other gives access to another set of available characters. Once the user decides which character to type out of a set of available characters, abuse character associated with that character is selected 112.

For example, to input a character "a" 121, the user clicks, drags a finger toward, taps, or otherwise selects the area on or around circular base character 116 designated to produce "A" or "a" 121 depending on case selected 108. Releasing the selection by releasing the mouse button, finger, or other selection tool inputs the intended final character into the text field or is acknowledged by the application running at the time of input. Using this general method, the user is able to input a variety of characters 120. A closer look at the workings of the virtual keyboard interface is described in detail below.

Figure 2A:
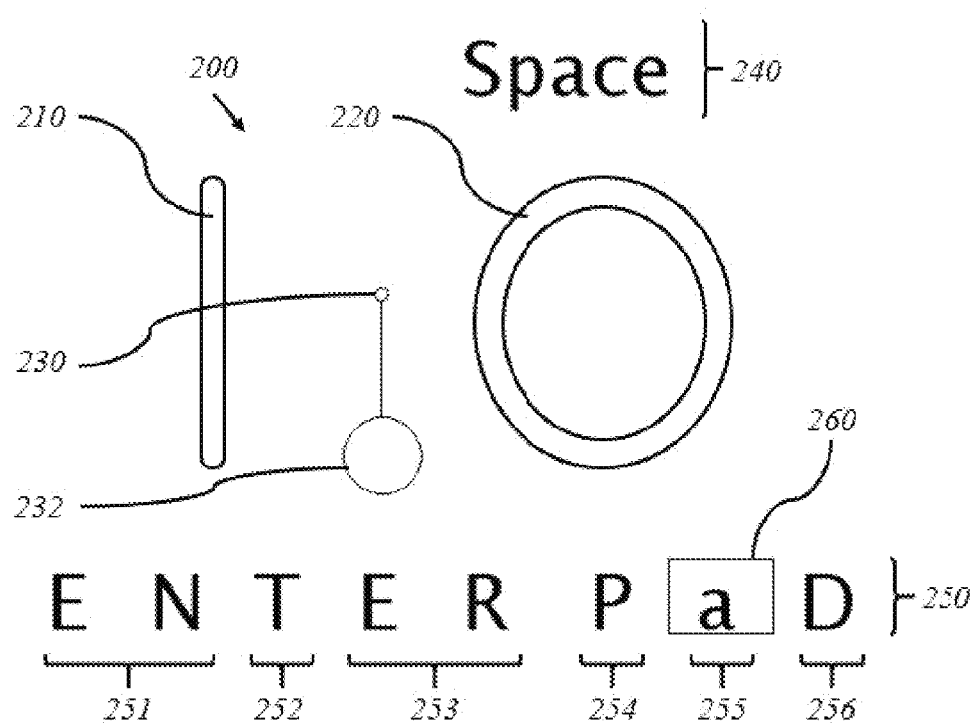
FIGS. 2a and 2b are schematics illustrating a close-up view of embodiments of the interface and its components.
Figure 2B:
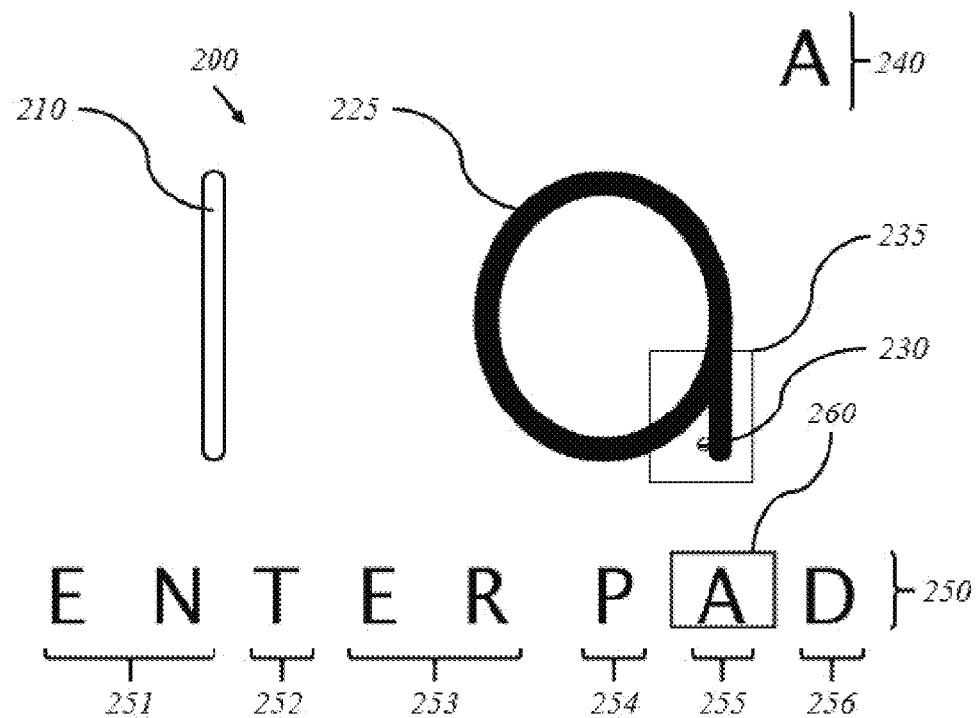

FIGS. 2a and 2b illustrate close-up views of some preferred embodiments of an interface 200 and its components. FIG. 2a is interface 200 at its neutral state. In some preferred embodiments of the English version, two base characters are shown: a linear base character 210 and a circular base character 220. Each base character generating a desired final character. A display marker 230 may be shown for guiding purposes. It shows where a mouse pointer, finger, stylus, or other selection tool is located or selecting within interface 200. One portion of interface 200 shows a preview 240 of the final character to be inputted. In FIG. 2a, an empty space is selected, as shown by the location of display marker 230; it is not over or near either base character. Thus, a space will be inserted when the selection is released. In a neutral state, there may not be any content within the area for preview 240.

In yet another area of interface 200, various options 250 are displayed. In some embodiments, options 250 allow input of common formatting characters. For example, selecting EN 251 inserts a line, much like the "Enter" key on a physical QWERTY keyboard. Selecting T 252 inserts a tab, much like the "Tab" key on a physical QWERTY keyboard. Selecting ER 253 removes the character immediately preceding the cursor, much like the "Backspace" key on a physical QWERTY keyboard.

Figure 3A:
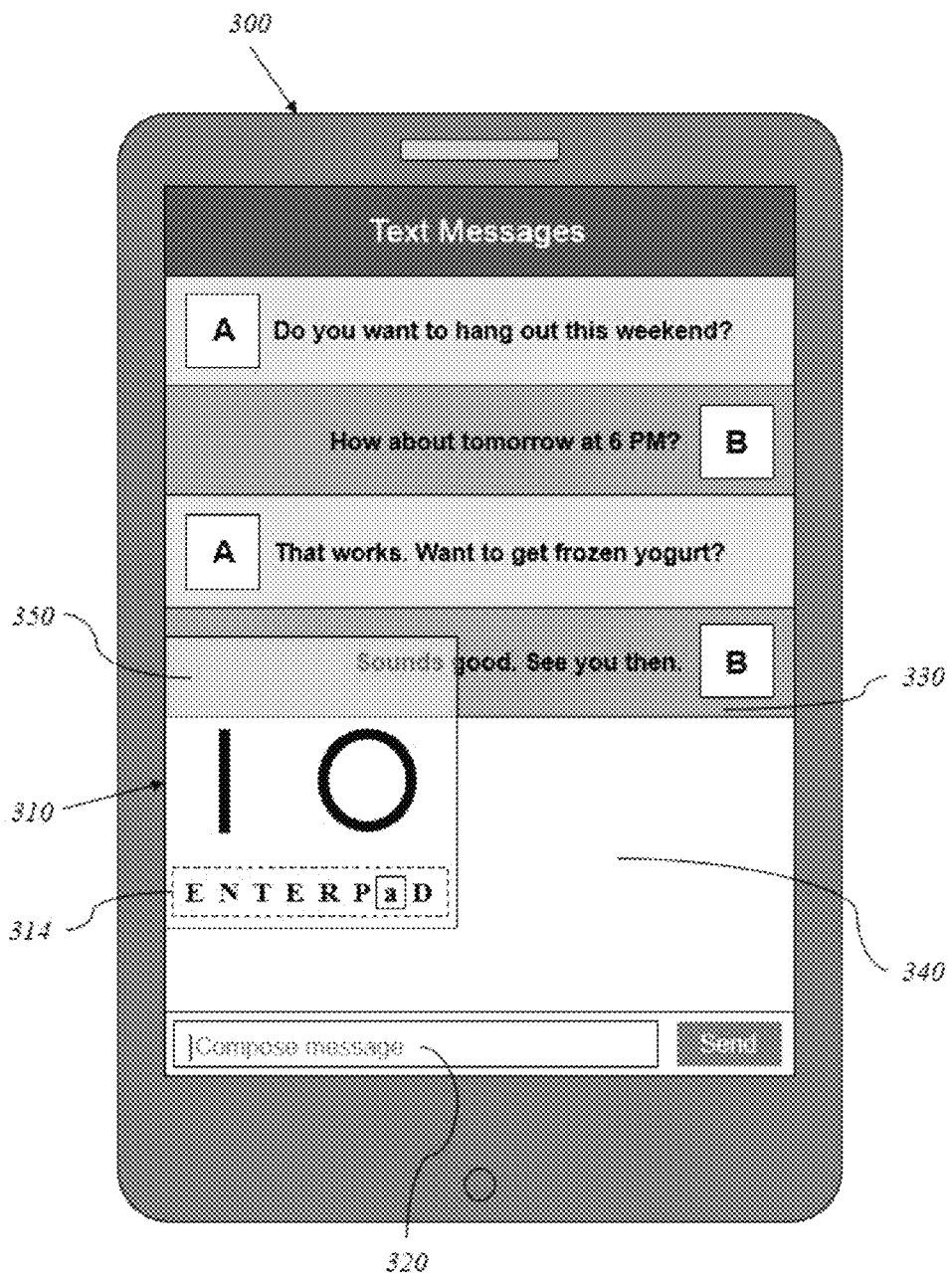
FIGS. 3a through 3c are schematics illustrating embodiments of the virtual keyboard interface in the context of a mobile device.
Figure 3B:
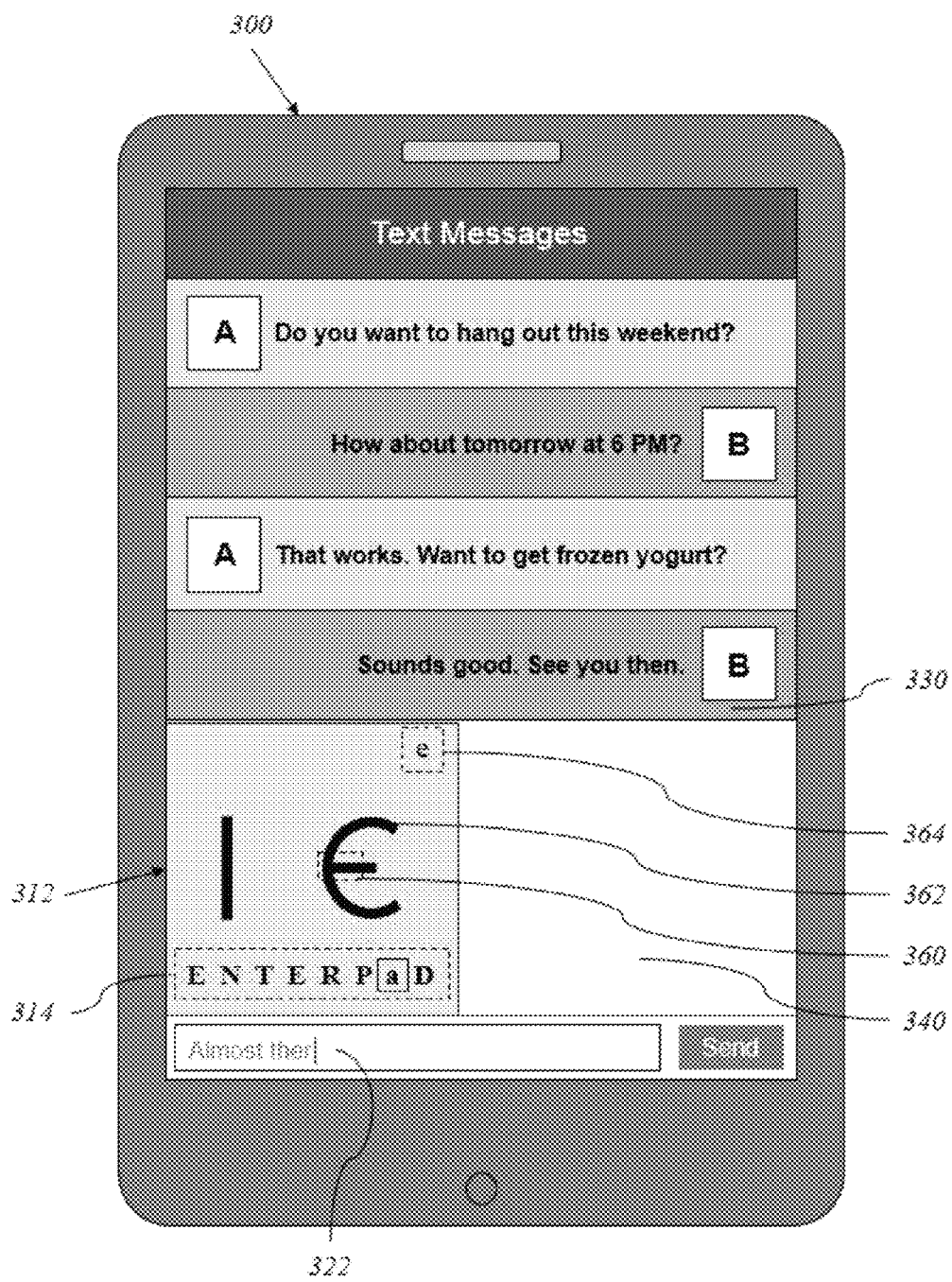
Figure 3C:
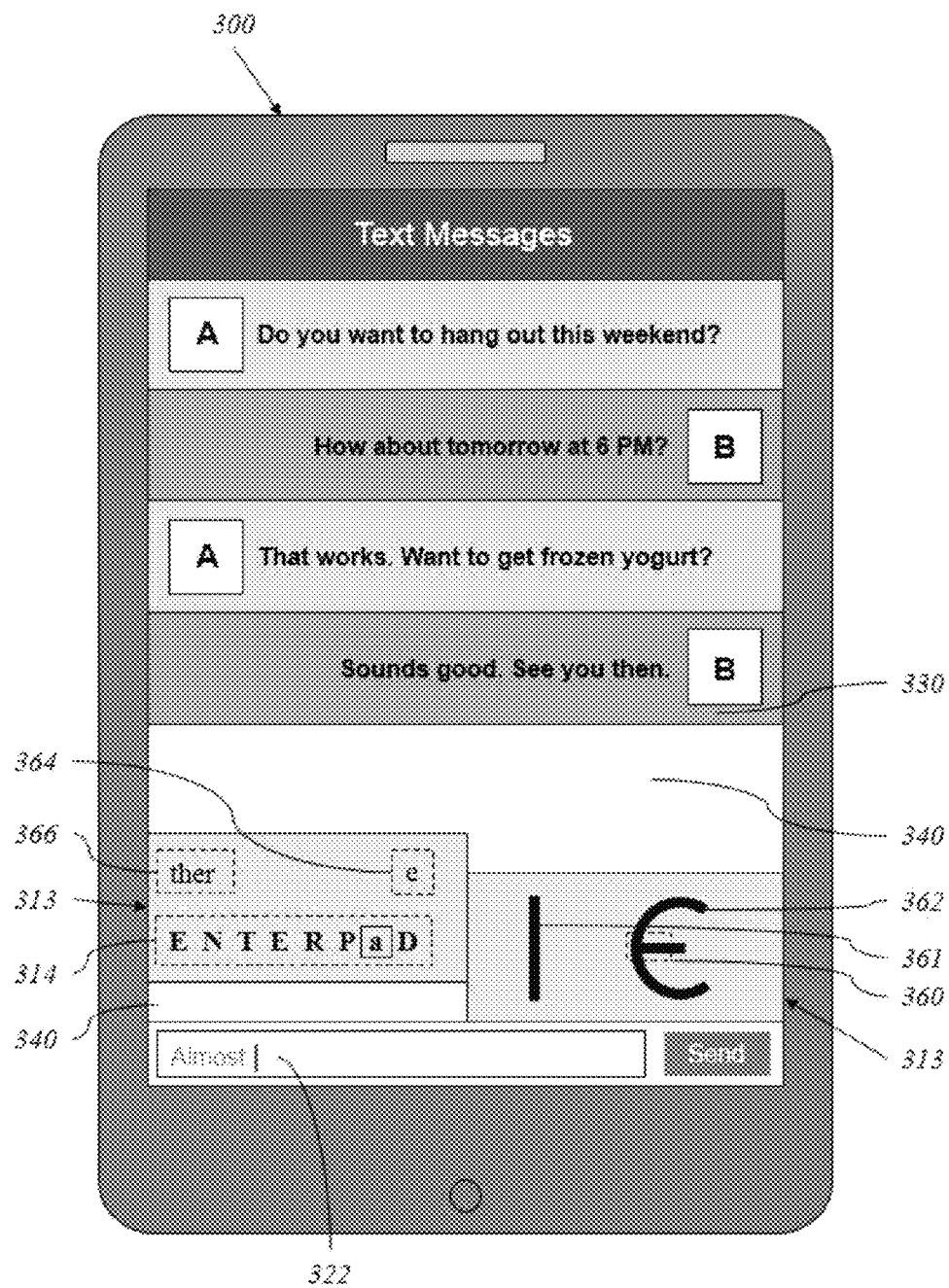

In some embodiments, different combinations of the aforementioned features and other options may appear at the top, vertically on the left or right side, or on the other side of the base characters in an elongated yet compact form of the interface (see FIG. 3c). In yet other embodiments, options 250 may be entirely divided and separated from the base characters in an independent panel, which may be transferred to other locations on the screen of a device. In the case of a device using a separate pointing device such as mouse, each panel can attached to and follow the mouse pointer and/or text cursor shown on the display screen. These capabilities give a user additional flexibility in using the interface.

Others options are available in addition to the aforementioned features. For example, as long as a user has toggled P switch 254, base characters generate punctuation marks. Similarly, as long as a user has selected D switch 256, base characters generate numerals, or digits, much like the "Num Lock" key on a physical QWERTY keyboard. While P switch 254 and D switch 256 has two states (on or off) between which the user may toggle, A/a switch 255 has three states: upper case, lower case, and caps lock. The user may select A/a switch 255 and cycle through the three available options. Which state the interface is in is denoted by a box 260 around P switch 254, A/a switch 255, or D switch 256. In FIG. 2a, lower-case letters have been selected, so base characters wilt generate lower-case letters.

In some embodiments, a user may set offsets 232 in the horizontal (x) and vertical (y) directions between the location of the interface and the area the user actually selects or touches. A user who sets offsets can input characters without interacting directly with the base characters on the interface. A user may also restrict one axis to allow movement in one dimension, as well as define relationships between multiple cursors created by one or multiple instances of the interface (see FIG. 2h). These features can be used for performing precision work or using a small touchscreen device, such as a mobile phone where fingers can obscure the screen.

some embodiments, keys available on a conventional QWERTY keyboard, such as arrow keys and typographical marks (ampersand, caret, etc.), are available independently of base characters 210, 220 and options 251-256 depending on design and programming variations. The interface itself may also be used to perform functions delegated to a mouse or a trackpad, such as pointing with a preexisting cursor or a new cursor (see FIG. 2h).

FIG. 2b illustrates an instance in which the user inputs an upper-case letter "A." Display marker 230 is located within an area 235 predefined to generate the letter "A." Upper case has been toggled using one of the switches 254-256 in the bottom-right corner, although these switches 254-256 may be shown anywhere in the interface. Specifically, A/a switch 255 now displays an upper-case "A" instead of the lower-case "a" as shown in FIG. 2a. A box 260 surrounds A/a switch 255 to indicate that interface 200 is ready to generate letters. Moving display marker 230 within predefined area 235 (also referred to as "key point") morphs circular base character 220 to a morphed character corresponding to an "a" 225, Morphed character 225 appears similar to script letter "a". The user may also hold and drag a finger, mouse pointer, or other selection tool from any of the switches 254-256 to predefined area 235 for the same effect.

Preview 240 accordingly shows an upper-case "A". A/a switch 255 displays either an "A" or an "a" depending on which case the user has selected. It will show an "A" or an "a" regardless of whether the user intends to input any character other than an "A" or an "a." For example, if the user desires to input the lower-case letter "b," the user should tap on A/a switch 255 until it indicates a lower-case "a." When it displays the lower-case "a" and is encased in box 260, denoting that base characters will generate lower-case letters, the user may proceed to input the letter "b" by selecting the area (not shown in the figure) predefined for "B" or "b".

Figure 2C:
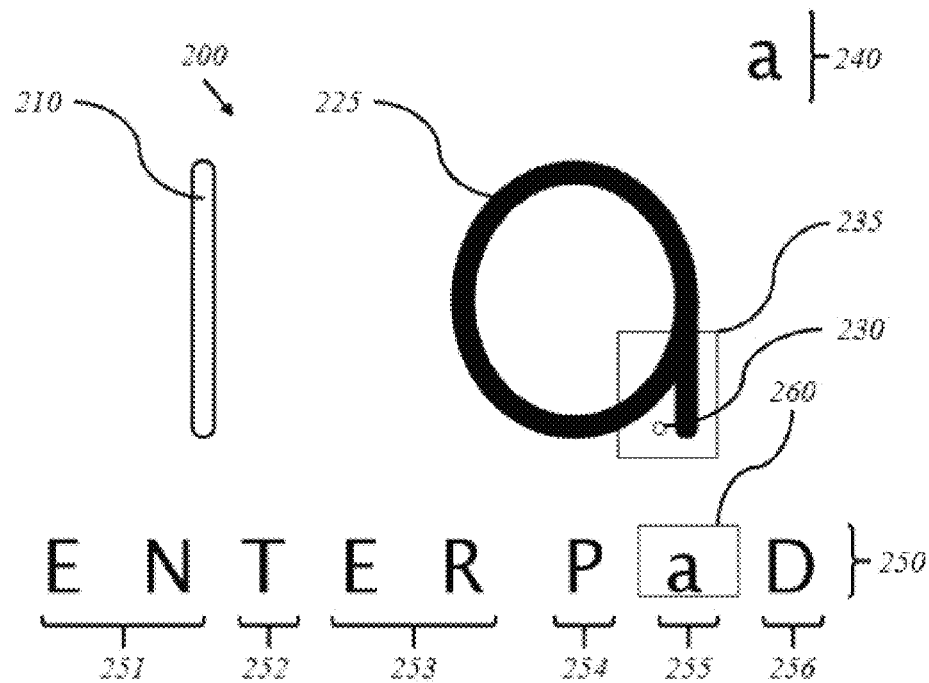
FIGS. 2c through 2e are schematics illustrating a comparison of closely related characters.
Figure 2D:
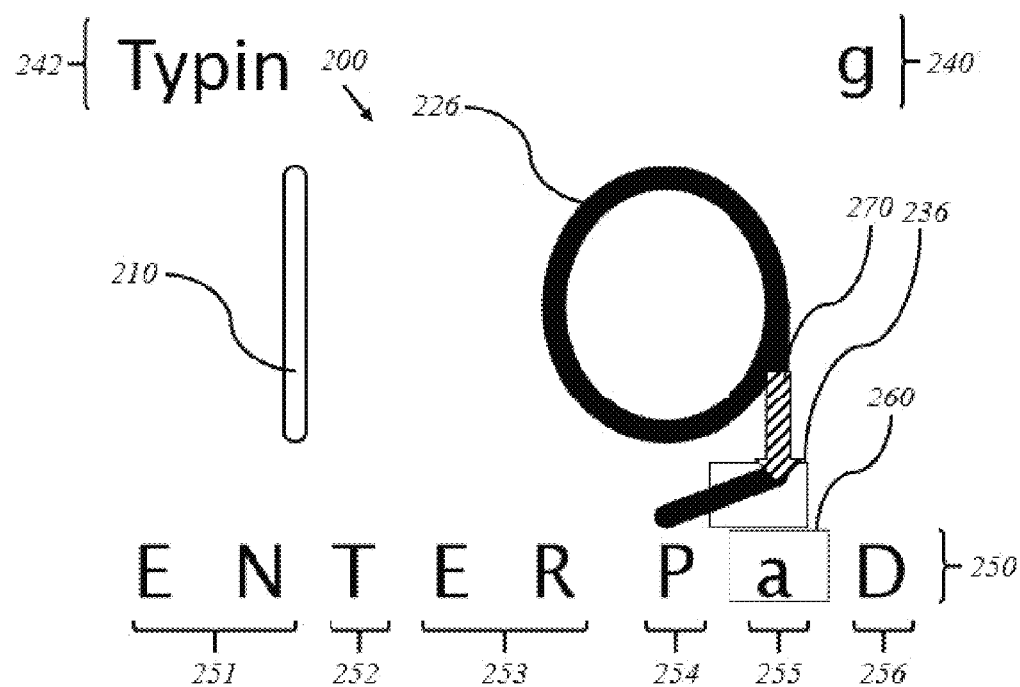
Figure 2E:
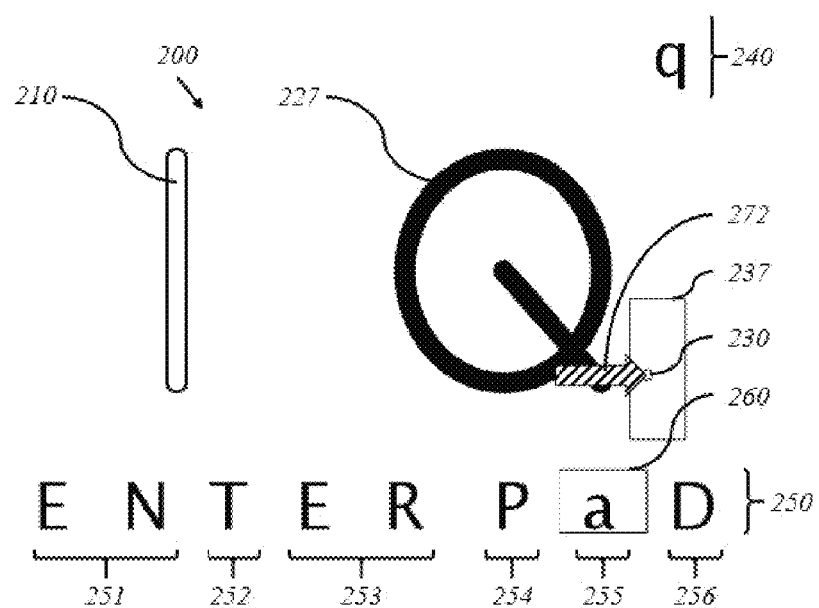
Figure 2F:
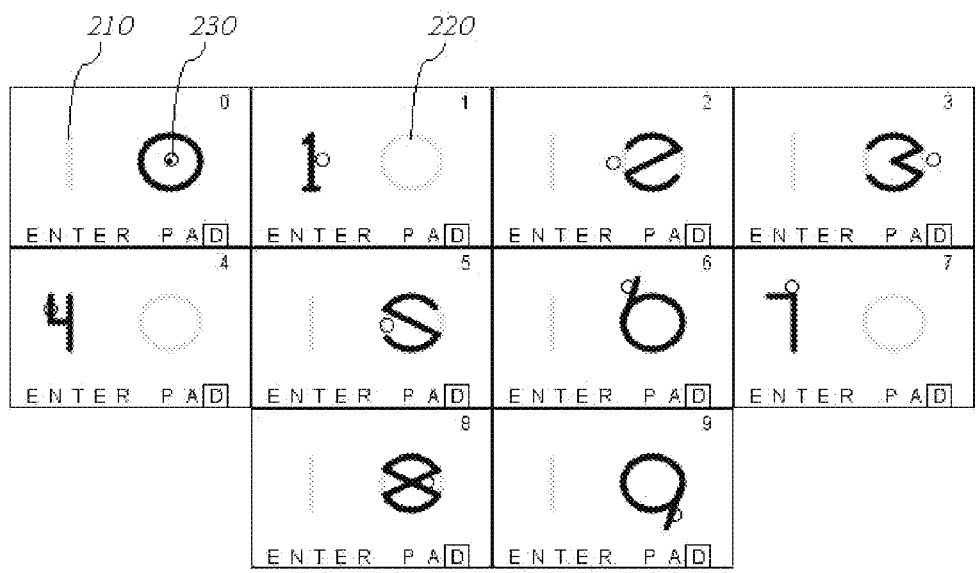
FIGS. 2f and 2g are sets of schematics illustrating the various morphed characters attainable through manipulation of two base characters in some embodiments.
Figure 2G:
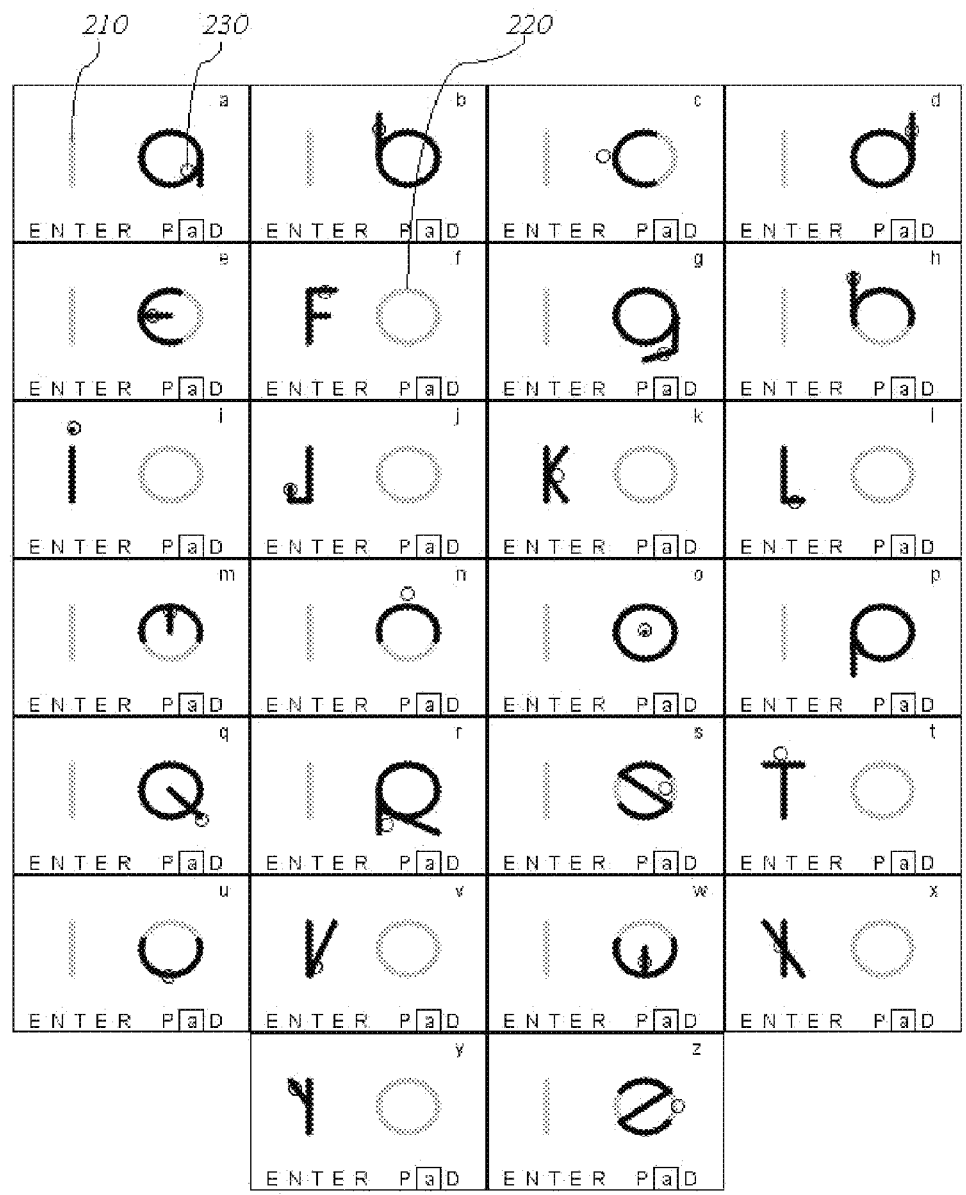

FIGS. 2c through 2e illustrate a comparison of closely related characters. For the purpose of showing similar characters situated around one base character, the letters "a," "g" and "q" of some preferred embodiments are described in detail. There are other sets of characters that are closely related and function similarly; the below-described elements may be implemented differently and are not limited to the descriptions shown or provided below. An exhaustive description of other related characters will be omitted to avoid unnecessarily obscuring the disclosure, but they exist in some embodiments of the present invention. However, relatively exhaustive sets of illustrations of available characters are shown in FIGS. 2f and 2g.

The present invention aims to present an intuitive relationship between base characters and final characters. Each of the illustrative letters in FIGS. 2c through 2e is generated from circular base character 225 purposely associated with each other because of a similar shape shared among the letters. Here, each of these letters has a circular stroke or element to it. This is evident in the figures, where morphed characters 225-227 resemble the final characters "a," "g," and "q." Morphed character corresponding to "a" 225 appears like script letter "a" (see FIG. 1), morphed character corresponding to "g" 226 appears like script letter "g" (see FIG. 1), and morphed character corresponding to "q" 227 appears like upper-case "Q" (in script or not).

FIG. 2c illustrates the state of virtual keyboard interface 200 as a user types a lower-case "a," Similar to FIG. 2b, the user taps, clicks, or otherwise selects predetermined area 235 predetermined to generate an "A" or "a" while selected option 260 indicates that case switch 255 is toggled to lower-case letters. Selecting anywhere within predetermined area 235 will produce an "a." Other areas predetermined to produce other characters do not overlap with area 235 designated for "A" or "a." For example, in FIG. 2d, the area that the user may select to produce a "G" or "g" is in a different location, albeit nearby, denoted by a box 236 for illustrative purposes. Similarly, in FIG. 2e, the area for "Q" or "q" is in yet another place, denoted by a box 237 in a different location.

Certain characters may be generated in a different way other than merely selecting a key point, such as boxes for "a," "g" or "q" 235-237 described above, in some embodiments, characters can be generated by a swiping motion. This action is more amenable to certain devices, such as touchscreen devices, including smartphones, tablets, smartwatches (i.e., computerized wristwatches with advanced functionalities similar to other mobile devices that run application software), wearable computers (such as Google Glass), laser pens, and TV remotes. The implementation of the present invention in different electronic or computing devices is described further below. In FIG. 2d, a downward arrow 270 is shown as an illustrative example of this motion. The user may swipe downward 270 starting from the right side of circular base character 220 (FIG. 2a) to generate a "g." The user need only make the downward swiping motion, not reach a particular key point to accomplish this. This motion is related to the resemblance to the way the letter is written. In script fonts, the letter "g" is written with a circular shape and then a downward stroke with a curve at the end, resulting in a shape similar to script "g." Downward motion 270 mimics the downward stroke that creates an approximate modification of the circular shape of base character 220 (FIG. 2a) by adding a downward mark to the right side of the base character, resulting in morphed character resembling a script "g" 226.

In some other embodiments, the final characters generated are collected before being sent to the input field. By way of example, FIG. 2d shows a preview area 242 for the word or phrase to be inputted—in this case, the word "Typing." This area 242 holds the word or phrase composed of final characters generated by the user before inputting it into the text field. The incomplete word "Typin" is shown in preview area 242, while the letter "g" is about to be generated, after which preview area 242 will display "Typing." When the word or phrase is complete, the user may edit it, send it to the input field, or it may automatically be transferred upon pressing Space (empty area of interface), Enter 251, Tab 252, a punctuation, or another mechanism for demarcating groups of text. Conversely, the user may recall an inputted word back into preview area 242 for modification by moving or deleting characters, for example. Editing and error correction are further discussed below.

In FIG. 2e, a rightward arrow 272 is shown as another example of the aforementioned swiping motion. Similarly as in FIG. 2d, a user may swipe from the right side of circular base character 220 (FIG. 2a) to generate a "q," but here, it is a rightward swipe 272 rather than downward. This is an example of a motion that is less intuitive than forming a "g" by swiping down. Writing "g" or "q" in script requires a downward stroke. However, a more-intuitive downward swiping 270 is assigned to generate a "g" because "g" is a letter known to be used more frequently in the English language than "q." Since the present invention attempts to maximize the intuitiveness of using the interface 200, it takes into account the frequency and likelihood of character usage. Balancing the intuitiveness of specific characters with the overall intuitiveness of the interface 200 results in associating "q" with a swiping motion less intuitive than a downward stroke. Nonetheless, rather than swiping, the user retains the option to merely select an area predetermined to generate a "q" 237. Furthermore, some embodiments allow reconfiguration of each swiping action to match the user's preferences. Thus, the present invention allows input of characters through multiple means that provide intuitive ways to remember the action required to generate each character.

In some other embodiments, characters may be automatically generated by holding for a certain period of time rather than selecting within the area 235. This feature eliminates the need to raise and lower the selection tool (finger, stylus, etc.) repeatedly.

In the description so far, each letter had a 1:1 correspondence to a certain predefined area assigned to the letter. In yet other embodiments, characters may be generated by morphing a base character twice. Some characters become accessible only after morphing a base character into a morphed character. For example, the letter "E" may be available after morphing a base character to the letter "C." Here, the user first moves the selection tool to an area designated for "C," and then moves it again to an area designated for "E." Attempting to access secondary characters such as "E" without first morphing a base character (to "C" in this case) may result in producing a different character. Similarly, the letter "R" may be available after morphing a base character to the letter "P." The letters "W" and "Q" may be available after morphing a base character to the letter "U." In effect, the initially morphed characters become sub-base characters from which other characters are generated. The user works with a three-tier process of generating a final character or a two-degree separation from base character to final character. The advantage of this type of input mechanism is a decreased number of predetermined areas to manage around each base character, resulting in increased sensitivity to input, since each predetermined area would be fewer in number and thus larger and allowed easier access. The advantage of having multiple output methods is that by catering to various user (preferences, the interface becomes easier to use despite being in a compact form not in the traditional two-hand layout.

In some preferred embodiments, virtual keyboard interface 200 allows error correction. Depending on the size and proximity of the predefined areas, denoted by rectangles 235-237 in FIGS. 2c through 2e, to one another, haphazard typing may lead to errors. For example, the user may intend to type "a" but instead of press over key point for "q" 237. Since a preview appears to show which final character is to be generated, and since base character 220 morphs to morphed character for "q" 227, the user can quickly correct the previous action by dragging the finger, mouse pointer or other selection tool to key point for "a" 235 without letting go. This facilitates expedient typing because the user need not let go of the selection tool that is held down (e.g., mouse button pressed down, finger in contact with touchscreen), and the user need not delete the mistaken character if the error is recognized in time. This feature is particularly helpful to a new user to find or learn the locations of various key points by maneuvering around the interface 200 with the finger or mouse held down.

Another error-correction feature is word prediction based on installed dictionaries. Much like modern word processors, modem electronic devices are capable of detecting words that may not be in the correct spelling. Such built-in spellcheckers often denote potentially misspelled words with a red line underneath. A user may correct such words by selecting the word in question, which opens up a list of suggestions from a dictionary. The present invention allows the user to also manually edit words by bringing it back to preview area 242 (FIG. 2d). Once content is brought back into preview area 242, individual characters may be moved or deleted. For example, the user may swipe down on a character to remove it. Or the user may select and hold a character, and then move it to the correct location. Once the word is spelled or arranged to the user's satisfaction, the user may send it back to the input field for reentry.

In other embodiments, the error-correction feature includes automatic correction. A word may automatically be edited to the correct word if the software underlying interface 200 has a high enough confidence level based on existing dictionaries. An electronic device or an application therein may have its own built-in autocorrecting function, however, and the present invention may take advantage of either function.

FIGS. 2f and 2g show examples of morphed characters activated by a small circular marker 230 showing the location of the selecting tool. In FIG. 2f, a set of morphed characters shaped like Arabic numerals from 0 to 9 is presented. In the illustrated embodiment, numerals 1, 4 and 7 are based on linear base character 210; numerals 0, 2, 3, 5, 6, 8 and 9 are based on circular base character 220. Consistent with the intuitiveness that the present invention aims to promote, the numerals based on one base character share a similar characteristic. Numerals 1, 4 and 7 comprise linear strokes or elements. Numerals 0, 2, 3, 5, 6, 8 and 9 have curved or closed, i.e., completely bounded, elements to them. Note that the D switch is toggled to enable numerals.

In FIG. 2g, a set of morphed characters shaped like English letters from a to z is presented. In the illustrated embodiment, letters f, i, j, k, i, t, v, x and y are based on linear base character 210; letters a, b, c, d, e, g, h, m, n, o, p, q, r, s, u, w and z are based on circular base character 220. Similar to the numerals described above, the letters are matched with base characters that share a similar characteristic. None of the letters based on linear base character 210 has curved or closed elements. Conversely, the letters based on circular base character 220 do have either curved or closed elements. It is this similarity that makes the virtual keyboard interface intuitive with a short learning curve despite being in a vastly different and simplified layout from the standard QWERTY keyboard.

Punctuation marks may be available based on the base characters. For example, in some embodiments, a comma and a semicolon are based on linear base character 210, while a period and a question mark are based on circular base character 220. In preferred embodiments, commonly used marks, such as comma, period, semicolon, or colon are available as separate keys.

Figure 2H:
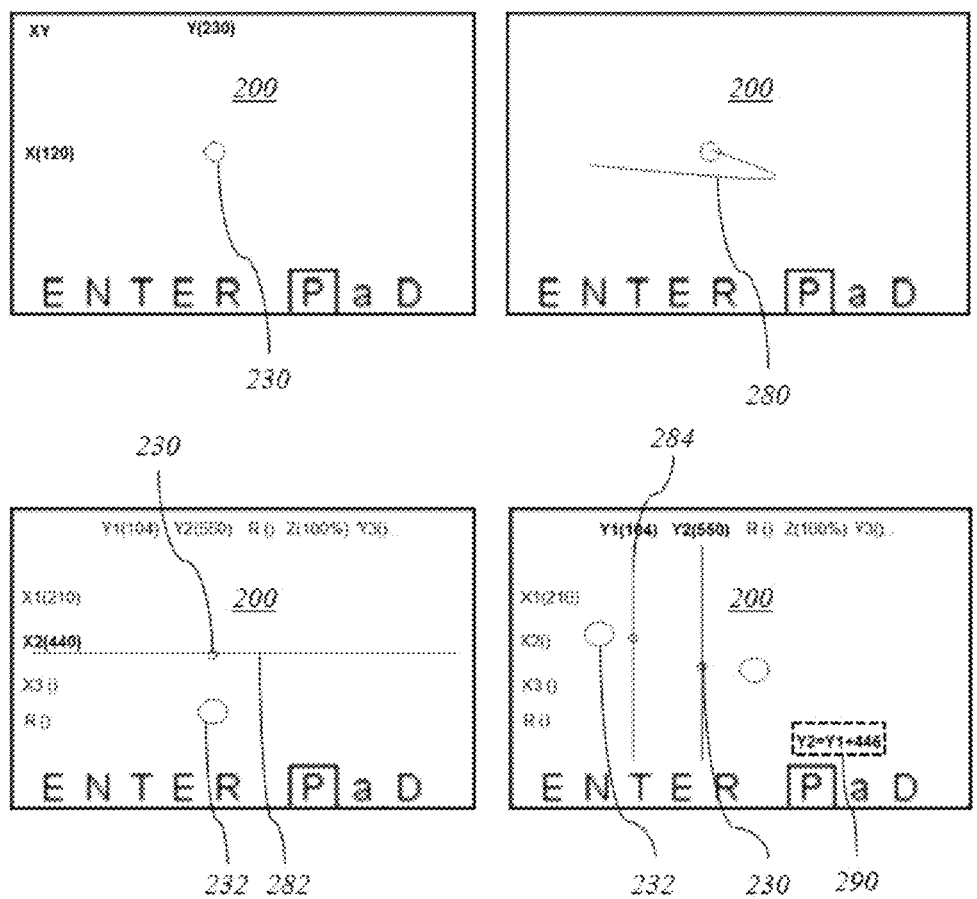
FIG. 2h shows schematics illustrating ways the interface may be used as a trackpad.

FIG. 2h show illustrations of a possible use of interface 200 as a trackpad. In some embodiments in certain modes, interface 200 may allow user control of a preexisting cursor (e.g., on a Windows operating system) or a new cursor on screen. Moving 280 display marker 230 also moves the outside cursor. The trackpad feature may also restrict movement of display marker 230 to one direction or axis. For example, display marker 230 may only move in a horizontal (x) axis 282 or vertical (y) axis 284. During such restriction, offset marker 232 linked to display marker 230 appears since the selection tool will be always (except when the selection tool is directly on axis 282 or 284) be offset from the actual location of display marker 230. A mathematical relationship 290 between multiple display markers, and thus outside cursors, can be established for further restriction. Precision work such as drafting and modeling in engineering may benefit from these functions.

FIGS. 3a and 3b illustrate one preferred embodiment of a virtual keyboard interface 310 in action within the context of a mobile, touchscreen device 300. FIG. 3a shows a neutral state of device 300 and a simplified version of virtual keyboard interface 310 with a set of options 314 placed at the bottom of interface 310. In this illustration, a sample volley of text messages is presented. A user first locates a text-input field 320, wherein the user may input characters. Usually, without the present invention installed on device 300, the user would see a traditional on-screen QWERTY keyboard that typically seizes half of the available screen space, or the user might enable voice recognition, which is prone to loss of privacy and input error, especially with background noise. Here, interface 310 may be brought up with little to no adverse effect on the on-screen real estate. Interface 310 itself requires a smaller area to function. It is possible that significantly less area than a quarter of the screen will be used at any given time. The user may adjust the size of the interface by dragging an edge or a corner of the interface, for example. Some embodiments may have preconfigured sizes that may be elongated along the bottom of the screen instead of having a similar length and width. Shrinking or enlarging allows the user to customize the experience to meet personal preferences. One reason for this could be to exchange space for accuracy of the inputs, since the size of key points 235-237 (see FIGS. 2b through 2e) would also adjust proportionally. Moreover, interface 310 may be moved to any other location on the screen, allowing for greater readability and versatility. This feature is further illustrated below.

A level of transparency is provided to interface 310, allowing practically the entire screen to be visible to the user. In FIG. 3a, interface 310 overlaps with both a message 330 that the user previously sent and an empty area 340. Part of message 330 overlapping 350 interface 310 would normally be obscured with an opaque overlay, but the transparency offered by interface 310 allows the word "Sounds" to be visible even though it is underneath interface 310. The level of transparency can be adjusted according to the user's preferences.

In FIG. 3b, device 300 is not in a neutral state but in a state in which the user is about to release the finger, stylus, or other selection tool to input a final character, which will result in generation and insertion of the letter "e" in an active text field 322. The user is in the middle of typing the message "Almost there" in active text field 322. To complete the message, the user has the selection tool over the dashed area denoting a key point 360 for the letter "e." A morphed character 362 and a preview 364 confirm that releasing the selection tool will generate and input the letter "e" in active text field 322. Note that here, the interface has been moved to a new position 312. Through dynamic placement of FIG. 3a's interface 310, it is no longer occupying space over previously sent message 330 and is only occupying empty space 340. In normal usage, interface 312 would likely overlap yet allow other consumable and interactive elements of the screen to be visible.

FIG. 3c shows another embodiment of the present invention, wherein an interface 313 is horizontally stretched. As mentioned previously, the dimensions of the interface may be preconfigured or adjustable; the interface may have separate panels containing different elements of the interface; input functions and options 314 may be displayed in a location other than below the base or morphed characters; and words in progress can be shown in a preview area 366 (see FIG. 2d for another example). This embodiment illustrates a state similar to that of FIG. 3b, where a user is typing the word "there" and is about to generate and display the final letter "e." However, unlike in FIG. 3b, the word fragment "ther" appears in preview area 366 rather than in active text field 322. Only upon pressing Enter, Tab, Space, a punctuation, or other demarcating character, is the completed word "there" transferred to active text field 322. Commands and options 314 are shown on the left side of elongated interface 313 instead of below the base or morphed characters. Interface 313 is noticeably divided into two panels, each of which may be independently manipulated. Consequently, two empty areas 340 are present. FIG. 3c demonstrates by way of example some of the various arrangements of the elements the interface may employ. Some or all of the aforementioned differences between FIGS. 3b and 3c may be present at one time. Some arrangements may be user selectable, and others may be preprogrammed. Other forms and configurations of the present invention will be apparent based on user or artisan preferences. For instance, options 314 may appear between the base characters.

Other desired configurations are possible and will be described below. In some embodiments, a user may toggle an option that allows display and use of multiple instances of the interface embodying the present invention. In such a configuration, each instance of the interface is independent of one another. For example, one interface may be set to input punctuations, while another could be in its letter-input mode. Based on user preference, coordination of more than one input pad introduces opportunities for more efficient data entry.

In some embodiments, the interface has a mode in which it becomes a remote input device for inputting characters on another screen. For example, a tablet may have the interface keyboard embodying the present invention, along with a touchpad, while a larger screen is presented without showing the interface. In this way, a presenter may input characters and other presentation material on the larger screen from afar. In effect, the interface becomes a wireless keyboard. Even as a remote device, it may combine other functions previously disclosed, such as using multiple interfaces, choosing the location of input, and manipulating characters by deleting or inserting them. Using a tablet or other device as a remote device may offer the benefit of the entire screen of the device since only the interface need be visible.

A diverse range of possible presentations of the present invention is possible on different devices. By way of illustration, the disclosures above present examples of operating the virtual keyboard interface on a mobile device or phone in particular, but references have also been made herein to other devices, such as tablets, smart-watches, smart TVs, TV remotes, wearable computers, laser pens, etc. Any computerized device that is capable of running code is amenable to the virtual keyboard interface. One advantage of the interface is its compact and flexible size, which allows it to fit even with minimal screen space. For example, while typing on a smartwatch may be limited because of the small screen space with few buttons to operate it, having the interface allows direct interaction with letters a user wishes to generate and input. Even if the interface occupies most of the screen, utilizing the preview area and adjusting the transparency of the interface would greatly increase the input speed. Smart TVs combine traditional television features with interactive features and Internet content. Thus, situations may arise where character input is needed. TV remotes can integrate a screen that features the virtual keyboard interface, or the smart TV itself may allow input via, for example, a touchscreen overlay attachment for the TV.

According to this invention, at least one embodiment provides a method of input using a virtual keyboard interface that overcomes present limitations in on-screen keyboards. Namely, in certain devices, such as handheld mobile devices, the on-screen keyboard takes up much space. Obscuring reference material that had been on screen before the keyboard was brought up. Typically, the on-screen keyboard occupies about half of the available screen. This is especially problematic in landscape mode, where the keyboard and input field usually take up the entire screen. Thus, the present invention offers a few-key interface that occupies significantly less space while providing transparency as well as dynamic placement anywhere on the screen, which results practically the entire screen being free to view while being able to input text or commands. One can see that such an on-screen interface that dramatically reduces the occupied screen area and simplifies the typing process because there are few keys (two in the preferred embodiment described). Although there may be a learning curve involved if the user is accustomed to traditional keyboard layouts, operation of the keys is made intuitive through the idea of morphing similarly shaped base characters. Error-correction features keep the rate of character generation unimpeded. As the user masters the positioning of strategically placed key points, the process of typing becomes expedient. The present invention provides this compact, versatile, easy-to-learn method of typing for nearly all platforms and devices.

Whereas many alterations and modifications of the present invention will no doubt become apparent to a person having ordinary skill in the art after having read the foregoing disclosure, the particular embodiments shown and described by way of illustration are in no way intended to be considered limiting. There are many alternative ways of implementing the invention. The disclosed examples are illustrative and not restrictive. Therefore, reference to the details of the preferred embodiments is not intended to limit their scope. Although the foregoing examples have been described in some detail for purposes of clarity of understanding and complete disclosure, the appended claims are not to be thus limited but are to be construed as embodying all modifications and alternative constructions that may occur to one skilled in the art that fairly fall within the basic teachings set forth here.

What is claimed is:

1. A method of data entry using a graphical user interface, comprising:
    causing the display on a screen of an electronic device a base character, the base character having a plurality of predefined areas, each predefined area corresponding to at least one final character;
    enabling the selection of a first area corresponding to a desired final character, the first area being one of the plurality of predefined areas for the base character;
    morphing the displayed base character into an intermediary character that directly overlaps the base character, the morphing of the displayed base character comprising transforming a shape of the base character to that corresponding to the intermediary character, the transformed shape corresponding to the intermediary character, the intermediary character comprising a precursor to the desired final character; and
    generating the desired final character.

2. The method of claim 1, further comprising displaying the desired final character on the screen of the electronic device.

3. The method of claim 1, wherein the enabling the selection of the first area corresponding to the desired final character further comprises displaying on the screen the intermediary character for the duration of the selection of the first area corresponding to the desired final character.

4. The method of claim 1, wherein the enabling of the selection of the area corresponding to the desired final character further comprises displaying on the screen a preview of the desired final character for the duration of the selection of the first area.

5. The method of claim 1, further comprising displaying on the screen a series of final characters, the series of final characters being editable by moving or deleting characters.

6. The method of claim 1, wherein the base character comprises both a linear base character and a circular base character.

7. The method of claim 1, wherein the enabling of the selection of the area corresponding to the desired final character further comprises enabling the swiping from a particular area on or around the base character toward another area on or around the base character.

8. The method of claim 1, wherein the electronic device is selected from the group consisting of: a personal computer, a touchscreen device, a mobile phone, a mobile tablet, a smartwatch, a motion-sensing device, a wearable computer, a laser pen, a television, and a television remote controller.

9. The method of claim 1, further comprising modifying the graphical user interface, the modifying selected from the group consisting of: resizing, dividing into separate panels, moving, duplicating, placing elsewhere within the screen, placing on a separate screen, and enabling transparency over other content displayed on the screen.

10. A non-transitory computer-readable medium having a plurality of instructions stored therein, the plurality of instructions are configured to, when executed by a processor, cause an electronic device to:
    display, on a graphical user interface of a screen of an electronic device, a base character, the base character comprising a plurality of predefined areas on or around itself, each predefined area corresponding to at least one final character, a portion of the base character comprising a shape that is similar to a stroke used in the final character;
    receive a selection of an area corresponding to a desired final character, the area being one of the plurality of predefined areas on or around the base character;
    morph the displayed base character into an intermediary character, the morphing of the displayed base character is configured to transform a shape of the base character to that corresponding to the intermediary character, the intermediary character being configured to overlay directly on the base character, the intermediary character comprising a corresponding precursor form of the desired final character; and
    generate the desired final character.

11. The non-transitory computer-readable medium of claim 10, wherein the plurality of instructions, when executed by the processor, are further configured to cause the electronic device to display the desired final character on the screen of the electronic device.

12. The non-transitory computer-readable medium of claim 10, wherein selection of the area corresponding to the desired final character further comprises a display of the intermediary character on the screen of the electronic device for the duration of the selection of the area corresponding to the desired final character.

13. The non-transitory computer-readable medium of claim 10, wherein the selection of the area corresponding to the desired final character further comprises a display of a preview of the desired final character on the screen of the electronic device for the duration of the selection of the area corresponding to the desired final character.

14. The non-transitory computer-readable medium of claim 10, wherein the plurality of instructions are further configured to, when executed on the processor, cause the electronic device to display on the screen a series of final characters, the series of final characters being editable by moving or deleting characters, or accepting any of one or more spelling suggestions.

15. The non-transitory computer-readable medium of claim 10, wherein the base character comprises both a linear base character and a circular base character.

16. The non-transitory computer-readable medium of claim 10, wherein the selection of the area corresponding to the desired final character further comprises the enablement of a swipe input, the swipe input comprising the selection of a particular area on or around the base character followed by a swipe toward another area on or around the base character.

17. The non-transitory computer-readable medium of claim 10, wherein the electronic device is selected from the group consisting of a personal computer, a touchscreen device, a mobile phone, a mobile tablet, a smartwatch, a motion-sensing device, a wearable computer, a laser pen, a television, and a television remote controller.

18. The non-transitory computer-readable medium of claim 10, wherein:
the graphical user interface is configured to be resized, divided into separate panels, moved, duplicated, placed anywhere within the screen, or placed on a separate screen, and
the graphical user interface is configured to allow transparency over other content displayed on the screen.

19. A system of data entry, comprising an electronic device with a screen configured to display a virtual graphical user interface, wherein the virtual graphical user interface is configured to:
display a base character defined for a selected language, the base character having a plurality of predefined areas on or around the base character, each area corresponding to at least one final character, wherein a portion of the base character comprises a shape that is similar to a stroke used in the final character;
enable selection of an area corresponding to a desired final character, the area being one of the plurality of predefined areas on or around the base character;
morph the displayed base character into a corresponding intermediary character, the corresponding intermediary character configured to directly overlap the base character, the corresponding intermediary character comprising a precursor form of the desired final character, and
generate the desired final character, wherein the desired final character is stored in the electronic device.

20. The system of claim 19, wherein the virtual graphical user interface is further configured to display the final character on the screen of the electronic device.

* * * * *